No. 622,216. Patented Apr. 4, 1899.
E. C. FRAZEE.
FRUIT GATHERER AND GRADER.
(Application filed May 17, 1898.)
(No Model.) 2 Sheets—Sheet 1.

Witnesses,

Inventor
Edwin C. Frazee
By Dewey Strong & Co.
Attys.

THE NORRIS PETERS CO., PHOTO-LITHO., WASHINGTON, D. C.

No. 622,216. Patented Apr. 4, 1899.
E. C. FRAZEE.
FRUIT GATHERER AND GRADER.
(Application filed May 17, 1898.)
(No Model.) 2 Sheets—Sheet 2.
Fig. 4
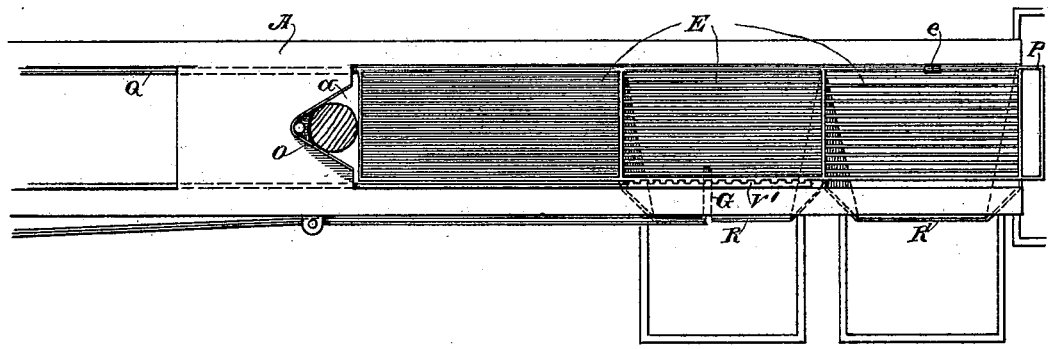
Fig. 5.
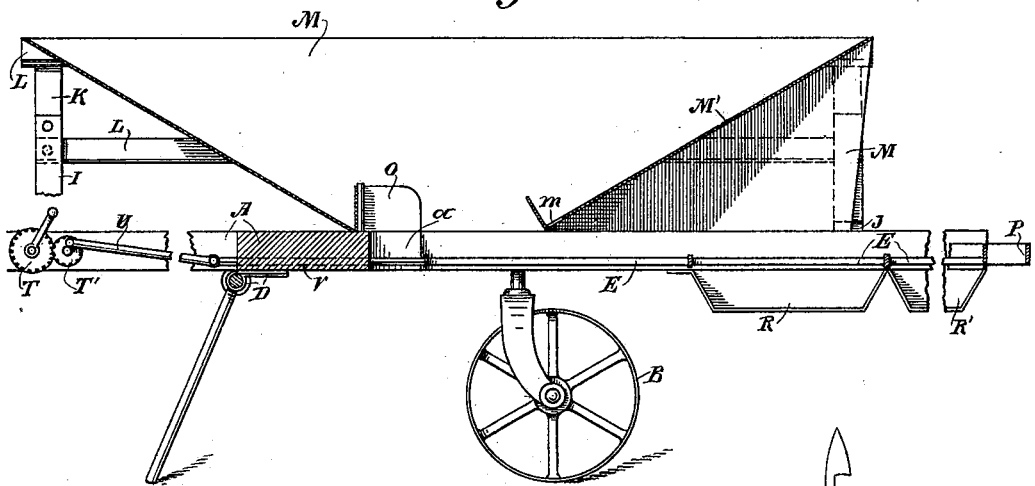
Fig. 6.
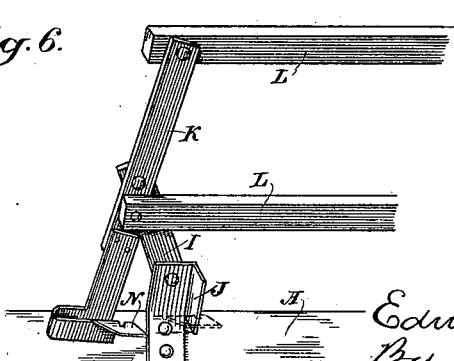
Fig. 7.
Witnesses,
Inventor,
Edwin C. Frazee
By Dewey Strong & Co
Attys

United States Patent Office.

EDWIN C. FRAZEE, OF SANTA ROSA, CALIFORNIA, ASSIGNOR TO HENRY DE WITT FRAZEE, OF SAME PLACE.

FRUIT GATHERER AND GRADER.

SPECIFICATION forming part of Letters Patent No. 622,216, dated April 4, 1899.

Application filed May 17, 1898. Serial No. 680,927. (No model.)

*To all whom it may concern:*

Be it known that I, EDWIN C. FRAZEE, a citizen of the United States, residing at Santa Rosa, county of Sonoma, State of California, have invented an Improvement in Fruit Gatherers and Graders; and I hereby declare the following to be a full, clear, and exact description of the same.

My invention relates to a device for gathering and grading fruit, and it is especially adapted for gathering prune-plums and similar fruit which it is necessary to protect from being bruised and which it is also desirable to grade or separate into sizes, as well as to clean from leaves, sticks, and dirt which may fall with them.

My invention consists of a handled truck mounted upon wheels, having the side bars extending a considerable distance to the front of the permanently-connected portion and carrying a screen or screens between them, said screens being adapted to open to allow the truck to be moved with the side bars on each side of the body of the tree and afterward to be closed with the tree projecting approximately centrally up through the truck. Upon each side of the truck-frame are foldable frames having canvas or other suitable flexible material attached, and these frames are folded close down alongside the truck while it is being introduced beneath the tree and afterward extended to receive the fruit which is shaken down.

My invention also consists in means for agitating the screen, means for latching and unlatching it, and in details of construction, which will be more fully explained by reference to the accompanying drawings, in which—

Figure 1:
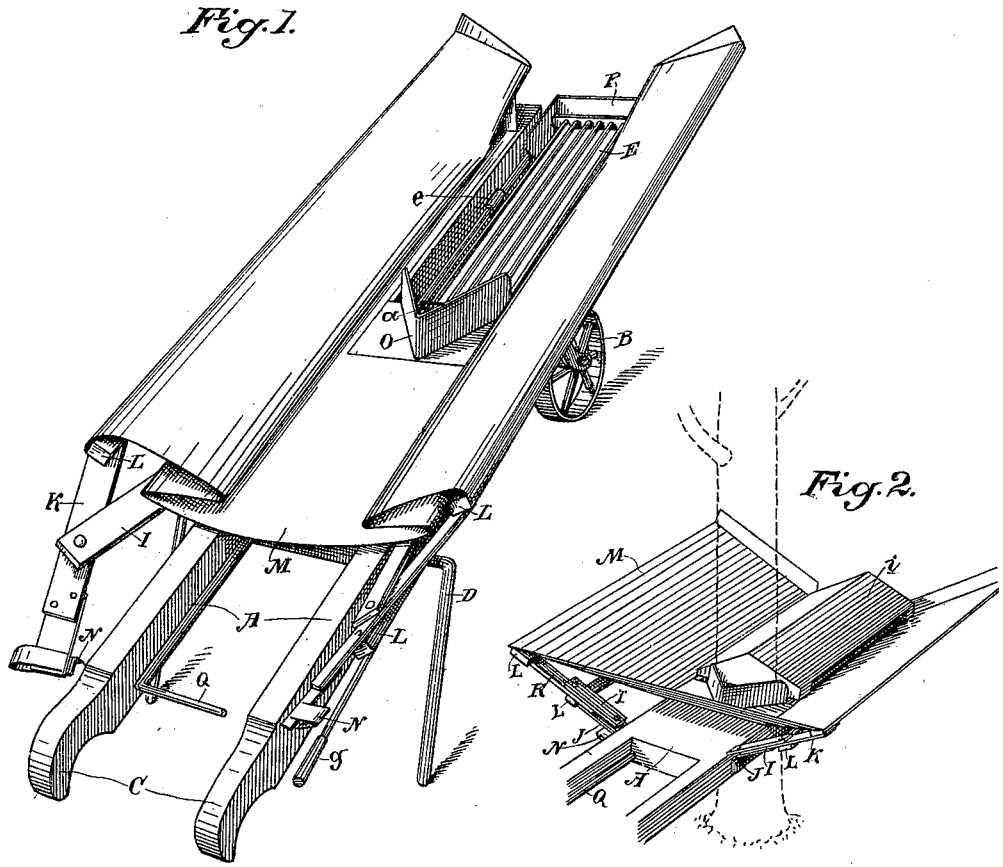
Figure 2:
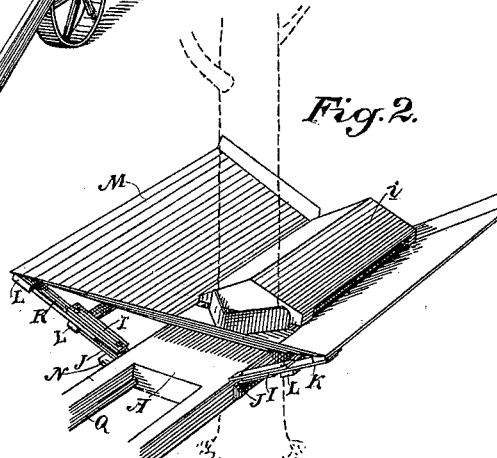
Figure 3:
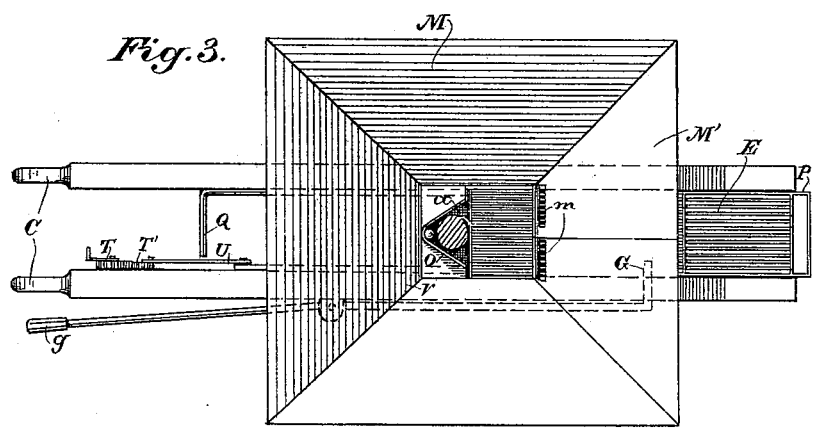

Figure 1 is a view of my gatherer, showing it folded up. Fig. 2 shows the device spread out. Fig. 3 is a plan of the same, showing the additional arrangements when used in connection with a grader. Fig. 4 is a plan of the grader. Fig. 5 is a longitudinal vertical section of Fig. 3. Fig. 6 shows the support for the canvas receiver. Fig 7 shows the kind of clasps I use for pulling in the branches.

In gathering prune-plums and other soft easily-damaged fruits it is desirable to employ a canvas or other flexible receiver, into which the fruit may fall. This class of receivers have been made in various ways. In my invention I combine with the receptacle for the fruit a means for immediately separating the dirt, sticks, and leaves from the fruit and also for grading the fruit into the various sizes which are most desirable for packing and marketing purposes.

In carrying out my invention I employ a truck A, consisting of two side timbers, with suitable connections by which the rear portion of them are united together, leaving the front ends of these side timbers projecting to a considerable distance without any interposed connecting-strips.

At some suitable point beneath the truck are fixed the wheels B, upon which it may be moved from place to place, and C are handles by which the operator can easily move it.

D represents a foldable support pivoted or hinged to the truck at a point near the handles, so that when the legs are turned downwardly they will support this end of the truck-frame, so that it stands at a considerable angle of inclination, the handles being the highest and the opposite end the lowest.

The front end of the closed portion $a$ of the truck-frame is grooved or hollowed out, as shown, and adapted to approximately fit around the body of a tree. In front of this the open portion between the side bars of the truck is provided with a screen or screens E, which may be hinged at one side, as shown, so that the screen may swing downward about its hinge $e$ or be turned up to stand horizontally, extending across from one side to the other between the side bars A of the truck. In this position the free edge is supported by a latch G, of any suitable description, which may be actuated by a handle or rod $g$, extending to a point within reach of the operator. The whole framework may have a length of twenty feet, more or less, and before the truck has been fitted to the tree the screen will be let down, hanging approximately vertically and leaving the space between the side bars of the truck open, so that the truck may be wheeled up with these side bars upon each side of the tree until the latter fits into the curve in the front part of the closed portion $a$. The screen is then turned up into a horizontal position and approximately fills the space in front of the tree. A flexible removable cover $i$ is placed over the screen to prevent fruit from falling directly upon it and guides direct the fruit to the screen from the receiver.

The receiver is constructed as follows: Upon each side of the truck are bars I, pivoted to inclined projecting plates J and extending outwardly and upwardly from these plates. To the outer ends of these bars are pivoted the bars K, which extend still farther beyond the ends of the bars I, and the two sets of these bars I K at each end of the truck are connected by longitudinal bars L, as shown. The bars are covered with a canvas or other soft flexible material M, which is so fitted to them that when extended it forms a rectangular hopper of three sides, having a rear or front end which may be left open or may be closed by supplemental strips of canvas M', which are connected with the sides and extend across the open front, the inclination of all the sides being such that any fruit falling into the device will be carried by the convergence of the sides down to a point nearly central of the device. The foldable arms K have latches N upon their lower ends, which engage with corresponding catches upon the plates J, so that when the bars I K are extended into line with each other these latches hold them firmly in place and with the flexible covering fully extended. It is desirable, however, to fold these arms and depress everything down to a point close to the sides of the truck while moving the apparatus beneath the tree on account of the low-hanging boughs, which often would not permit the truck to be placed if the sides were fully extended. The sides are therefore folded, as described, lying closely against the sides of the truck until it has been pushed in about the tree, after which they are again extended and latched in place, as previously described. The fruit may then be shaken from the tree by any suitable device. I have here shown a long handle having a clasp at the end adapted to grasp the limbs, so that the operator can shake them and disengage the fruit, which, falling upon the canvas, will roll down and be concentrated toward the center. In order to prevent its escaping from the rear around the body of the tree, which may not fit very closely in the space through which it projects, I have shown a V-shaped guide O, which will divert the fruit at this point and cause it to pass toward the rear end, and from there it falls inwardly upon the screen E with the fruit which has also fallen and rolled down the sides of the gatherer. All this fruit falling upon the screen will be divested of dirt, sticks, and leaves which may be mixed with it and by reason of the inclined position will roll down the screen toward the end, where a transverse end piece P prevents its going too far; but a slot or channel between this end piece and the end of the screen allows the fruit to fall through and into a box placed for its reception.

In order to prevent the fruit falling directly upon the screen, I have shown a frame adapted to fit the space above the screen, having a roof-shaped covering, of flexible canvas, as shown at $i$, and any fruit falling upon this will be diverted to the sides, where it will meet the fruit flowing down the sides and with it pass through spaces made beneath this roof portion and upon the screen. The screen may be given a shaking motion by means of a handle Q, which extends from it up to a point near the handles of the truck and which can be operated at any time to agitate and move the fruit upon the screen. When constructed in this manner, the fruit will simply be separated from the dirt and deposited in boxes, but will not be graded. When it is desired to grade the fruit, the screen will be divided into a plurality of sizes, as shown in Figs. 3 and 4. The first of these sizes, having the bars most closely together, will receive the fruit, because when this grader is used the end section M' of the receiver is also employed, so that all the fruit is delivered upon this first section. The fruit falling upon this end section M' passes through slots or channels $m$, made in it, and the remainder of the fruit passes down the inclines of the main portion of the gatherer and falls upon the first section of the screen, the sticks, leaves, &c., being separated from the fruit, and any further small fruit also passes through this portion of the screen. The next section of the screen is made with the wires farther apart, and any small fruit will pass between these wires, falling into a chute or trough R, which conveys it to one side and delivers it into boxes placed for its reception. The next grade of fruit passes upon the third portion of the screen, which is of still larger mesh, and is similarly received by a chute R' and delivered into boxes. The final discharge may take place over the end of the screen, as previously described.

The agitation of the screen may be effected, as previously described, by hand, or it may be produced by means of a gear-wheel T and pinion T', having a crank-pin upon it, and this is connected by a rod U with the sliding rack-bar V. This rack-bar has teeth, as shown at V', which engage with corresponding teeth upon the edge of the screen-frame, and by simply turning the pinion the screen will be oscillated sufficiently for the purpose. The connection may be made upon either side, as may be found most convenient. If upon the side where the screen opens, the teeth upon the rack-bar and the screen will easily disengage from each other when the screen is dropped and will as readily engage when it has been lifted up into place.

Having thus described my invention, what I claim as new, and desire to secure by Letters Patent, is—

1. In a fruit-gathering device, a wheeled truck having handles and a foldable support for the end adjacent to the handles, the side bars of the truck-frame extending beyond the closed portion and adapted to pass upon each side of a tree-body, a screen hinged between said separated sides and adapted to close and be latched after the truck has been fitted against the body of the tree, and inclined flexible sides into which the fruit is received from the tree and by which it is guided to the screen.

2. In a fruit-gathering device of the character described, a wheeled truck with supports by which it is held in an inclined position, a screen hinged to the projecting front end of one of the truck sides, and a latch by which it is engaged so as to extend between the two sides of the truck-frame after the latter has been fitted to a tree, a receiver consisting of a flexible material, supports consisting of bars adapted to be extended to retain the receiver in position, and guides whereby the fruit received therein will be directed to the screen.

3. In a device of the character described, a wheeled truck having side bars with handles at one end, the other end extending forwardly so as to inclose the body of a tree, a screen hinged to one of said bars and a latch by which it may be engaged and held in a horizontal position after the truck is in place with relation to the tree, a receiver and director for the fruit consisting of arms hinged and extending upwardly and outwardly from the truck sides, other arms hinged to their outer ends whereby the two are foldable upon each other and against the sides of the truck, and latches by which they are engaged and retained in an extended position when opened.

4. An apparatus for gathering fruit, consisting of a wheeled truck having the front end open and adapted to fit about the body of the tree, and a hinged swinging screen between the open sides, catches whereby the screen may be raised and held in a horizontal position after the tree is in place, upwardly-diverging flexible sides and extending foldable arms by which they are supported in a hopper shape, a V-shaped guide fitting against the body of the tree, and a supplemental covering above the screen whereby the fruit is received and directed forwardly and downwardly upon the screen without contact with the frame.

5. In an apparatus for gathering fruit, a wheeled truck with handles and supports, having the front ends of the side frames extended to fit about the body of the tree and a screen hinged to one of said sides so as to be opened to allow the truck to be wheeled up to the tree, a catch by which it is held in a horizontal position when again closed, an arm connecting with the screen whereby it may be given a shaking motion, and a receiving flexible hopper with foldable frame hinged to the sides of the truck, whereby when extended it directs the gathered fruit upon the screen.

6. In an apparatus for gathering fruit, a wheeled truck with open front, foldable extension-bars hinged upon each side having a flexible covering fixed thereto adapted to fold against the sides of the truck when the latter has been introduced beneath the tree and afterward be extended, with latches whereby the extension-arms are held in place, a supplemental front fitting the open portion of the hopper, a screen-frame hinged to one of the extended front ends of the truck-frame and a latch by which it is held in engagement with the other, said screen being made in sections so as to act as a grader, directing devices whereby the gathered fruit is converged and delivered upon the uppermost screen of the grader, and a mechanism for agitating the screen so as to move the fruit from one end to the other and separate it, and means for delivering it into boxes.

7. An apparatus consisting of a wheeled truck, a flexible foldable and extensible hopper connecting with the truck sides, a grading-screen hinged between said sides and adapted to close and be latched after the truck is fitted against the body of the tree, said screen adapted to convey the fruit passing through it to one side, and a rod or bar connected with the screen, for agitating the latter.

8. In an apparatus of the character described, a wheeled truck, the front of which is adapted to fit the body of the tree, a flexible, foldable and extensible hopper connecting with the truck sides, a screen fitting between the front extended ends of the truck adapted to receive and clean and grade the fruit, and a shaking device consisting of a reciprocating toothed bar, corresponding teeth upon the edge of the screen-frame with which the toothed bar engages and a pitman and crank connecting therewith, and multiplying-gear whereby a reciprocation of the screen may be effected.

In witness whereof I have hereunto set my hand.

EDWIN C. FRAZEE.

Witnesses:
H. DE. FRAZEE,
S. H. NOURSE.